United States Patent Office 3,287,371
Patented Nov. 22, 1966

3,287,371
4-IMINO-2,2,5,5-TETRAKIS (FLUOROALKYL)-1,3-DI-
OXOLANES AND THEIR PREPARATION FROM
FLUOROKETONES AND ALKYL ISOCYANIDES
William J. Middleton, Wilmington, Del., assignor to E. I.
du Pont de Nemours and Company, Wilmington, Del.,
a corporation of Delaware
No Drawing. Filed Feb. 26, 1965, Ser. No. 435,740
20 Claims. (Cl. 260—340.9)

This invention relates to, and has as its chief objects provision of, certain novel iminodioxolanes and a synthesis of the same.

The novel compounds of the invention have the formula

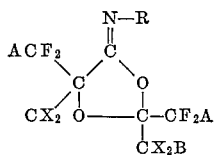

wherein: A is fluorine or chlorine and B is fluorine or the A and B in the two groups attached to the same carbon in the dioxolane ring taken together are —CF$_2$—; X is fluorine or chlorine; and R is alkyl or cycloalkyl of up to 20 carbons.

These iminodioxolanes are prepared by contacting a ketone of the formula ACF$_2$COCX$_2$B with an alkyl or cycloalkyl isocyanide of the formula RNC, A, B, X and R having the meanings given above. The general equation for the reaction, a direct addition, can be written as

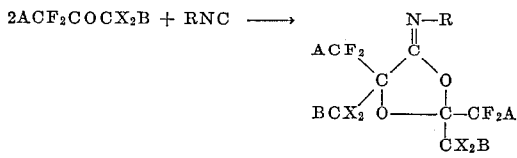

Both the fluorinated ketone and isocyanide reactants are well known materials, the preferred ketone being hexafluoroacetone.

Process conditions for the reaction, e.g., temperature, pressure and time, are not critical. Temperatures from —80° C. to +100° C. are preferred, although temperatures as low as —120° C. and as high as 200° C. are operable. Atmospheric pressure is preferred for convenience, although pressures above and below atmospheric are also operable.

Reaction time may vary from a few minutes to several hours, e.g., from one minute to 24 hours or more. Since the reaction is exothermic, it is convenient to add one reactant to the other at a rate such that the reaction mixture is maintained at the desired temperature. The product can be isolated from the reaction mixture immediately after the addition of the reactants is complete or the reaction mixture can be held for several hours longer.

The reaction can be conducted in the absence of solvent, or in the presence of an inert solvent or reaction medium such as hydrocarbon ethers, carbonitriles, aliphatic and aromatic hydrocarbons, and chlorocarbons. A stoichiometric excess of either the ketone or the isocyanide may be used, but for maximum efficiency, a ratio of two molar equivalents of the ketone to one molar equivalent of the isocyanide is preferred. The products are isolated and purified by ordinary methods, e.g., distillation.

The products of this invention are, in general, colorless liquids or low-melting solids useful as solvents for polymers containing a high percentage of fluorine at room or slightly elevated temperatures.

There follow some nonlimiting examples illustrating the products and process of the invention. In these examples, pressures are atmospheric unless otherwise noted.

Example 1.—4-cyclohexylimino-2,2,5,5-tetrakis-
(trifluoromethyl)-1,3-dioxolane

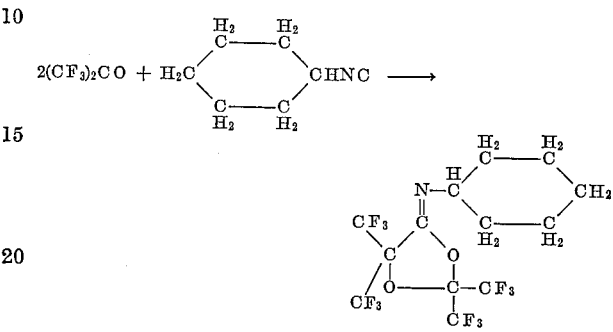

Hexafluoroacetone, 21 ml. at —78° C. (0.2 mole), was slowly distilled into a flask fitted with a Dry Ice-cooled reflux condenser and containing 10.8 g. (0.1 mole) of stirred cyclohexyl isocyanide. An exothermic reaction occurred. The rate of the addition was adjusted so that the temperature of the reaction mixture remained between 30–50° C. The reaction mixture was distilled at reduced pressure to give 39.7 g. (90%) of 4-cyclohexyl-imino-2,2,5,5-tetrakis(trifluoromethyl)-1,3-dioxolane as a colorless liquid, B.P. 33–34° C. (1.0 mm.), $n_D^{25}$ 1.3556. The F$^{19}$ n.m.r. spectrum shows two septets, and the infrared spectrum contains a band at 5.68$\mu$ for C=N.

Analysis.—Calcd. for C$_{13}$H$_{11}$NO$_2$: C, 35.40; H, 2.52; F, 51.67; N, 3.18. Found: C, 34.65; H, 2.20; F, 51.60; N, 3.75.

Example 2.—4-t-butylimino-2,2,5,5-tetrakis(trifluoro-
methyl)-1,3-dioxolane

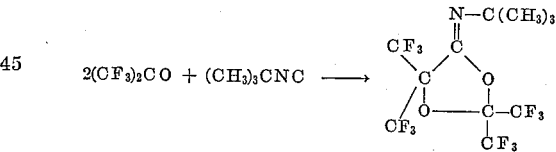

Hexafluoroacetone, 21 ml. at —78° C. (0.2 mole), was slowly distilled into a flask containing 8.3 g. (0.1 mole) of t-butyl isocyanide cooled by means of an ice bath. The resulting reaction mixture was distilled to give 30.8 g. of 4-t-butylimino-2,2,5,5-tetrakis(trifluoromethyl) - 1,3 - dioxolane as a colorless liquid, B.P. 52–53° C. (2.6 mm.), $n_D^{25}$ 1.3240. The infrared spectrum contained a band at 5.64$\mu$ for C=N. The F$^{19}$ n.m.r. spectrum contained two multiplets. The proton n.m.r. spectrum (60 mc.) contained a singlet at 1.32 p.p.m. lower field from the resonance of tetramethylsilane.

Analysis.—Calcd. for C$_{11}$H$_9$F$_{12}$NO$_2$: C, 31.82; H, 2.19; F, 54.92. Found: C, 32.48; H, 2.39; F, 54.97.

Example 3.—4-ethylimino-2,2,5,5-tetrakis(tri-
fluoromethyl)-1,3-dioxolane

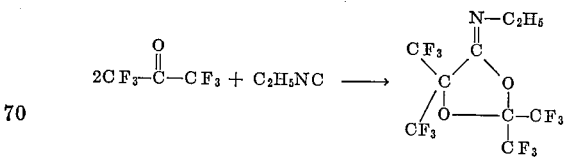

Hexafluoroacetone was distilled into a flask fitted with a Dry-Ice-cooled condenser that contained 27.5 g. (0.5 mole) of ethyl isocyanide. A highly exothermic reaction occurred. The rate of addition was adjusted so that the temperature of the reaction mixture remained below 50° C. The addition was stopped when no further evidence of a reaction was observed. Approximately one mole of the ketone had been added. The reaction mixture was distilled at atmospheric pressure to give 151 g. (80%) of 4-ethylimino-2,2,5,5-tetrakis-(trifluoromethyl)-1,3-dioxolane as colorless liquid, B.P. 120–121° C., $n_D^{25}$ 1.3151, I.R. 5.65μ. The proton n.m.r. showed a triplet at 1.25 p.p.m. ($J=9$ c.p.s.) and a quartet at 3.61 p.p.m. ($J=8$ c.p.s.). The $F^{19}$ n.m.r. showed two septets ($J=5.25$ c.p.s.) centered at +466 c.p.s. and +781 c.p.s. from Freon 112.

*Analysis.*—Calcd. for $C_9H_5F_{12}NO_2$: C, 27.93; H, 1.30; F, 58.88; N, 3.62. Found: C, 28.78; H, 1.49; F, 58.84; N, 3.66.

This dioxolane was recovered unchanged after it was heated under reflux with concentrated hydrochloric acid for 20 hours.

*Example 4.—4-ethylimino-2,5-bis(trifluoromethyl)-2,5-bis(chlorodifluoromethyl)-1,3-dioxolane*

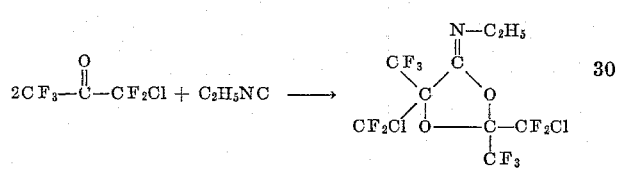

Chloropentafluoroacetone, 36.5 g. (0.2 mole), was distilled into a flask containing 5.5 g. (0.1 mole) of ethyl isocyanide cooled to −78° C. by a Dry Ice-acetone bath. The reaction mixture was then distilled to give 37 g. (88%) of 4-ethylimino-2,5-bis(trifluoromethyl)-2,5-bis-(chlorodifluoromethyl)-1,3-dioxolane as a colorless liquid, B.P. 55.5–56° C. (10 mm.), $n_D^{25}$ 1.3634, I.R. 5.70μ. The proton n.m.r. showed a triplet (Area 3, $J=7.5$ c.p.s.) at 1.27 p.p.m. and a quartet (Area 2, $J=7.5$ c.p.s.) at 3.70 p.p.m.

*Analysis.*—Calcd. for $C_9H_5Cl_2F_{10}NO_2$: C, 25.74; H, 1.20; Cl, 16.88; F, 45.24; N, 3.33. Found: C, 25.94; H, 1.33; Cl. 16.72; F, 45.04; N, 3.40.

*Example 5.—4-ethylimino-2,5-bis(dichlorofluoromethyl)-2,5-bis(chlorodifluoromethyl)-1,3-dioxolane*

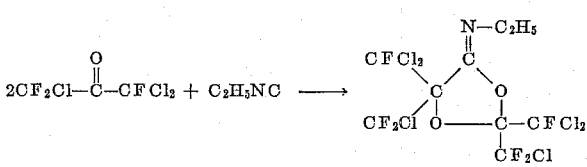

Ethyl isocyanide, 5.5 g. (0.1 mole), was added dropwise over a period of 30 min. to 43.1 g. (0.2 mole) of stirred 1,3,3-trichloro-1,1,3-trifluoroacetone cooled to 0° C. The reaction mixture was distilled to give 41.5 g. of 4 - ethylimino - 2,5 - bis(dichlorofluoromethyl)-2,5-bis-(chlorodifluoromethyl)-1,3-dioxolane as a colorless liquid, B.P. 83–86° C. (0.25 mm.), $n_D^{25}$ (supercooled) 1.4507, I.R. 5.72μ, that solidified to a white solid, M.P. 28–30° C., upon cooling.

*Analysis.*—Calcd. for $C_9H_5Cl_6F_6NO_2$: C, 22.25; H, 1.04; Cl, 43.79; F, 23.46; N, 2.88. Found: C, 22.52; H, 1.24; Cl, 43.58; F, 23.23; N, 2.65.

*Example 6.—4-cyclohexylimino-2,2,5,5-tetrakis(chlorodifluoromethyl)-1,3-dioxolane*

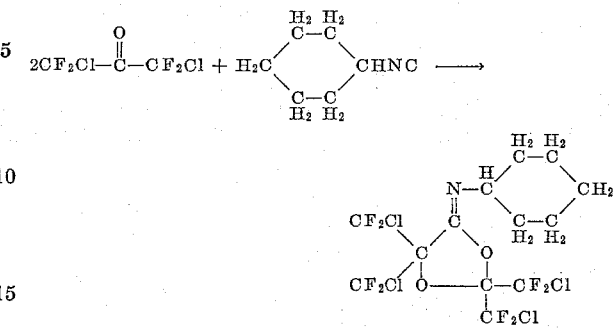

A mixture of 25 g. of 1,3-dichloro-1,1,3,3-tetrafluoroacetone in 25 ml. of ether was cooled in an ice bath and stirred while adding 5.5 g. of cyclohexyl isocyanide in 10 ml. of ether keeping the temperature below 25° C. After standing overnight, the product was distilled to give 24 g. (95%) of 4-cyclohexylimino-2,2,5,5-tetrakis(chlorodifluoromethyl)-1,3-dioxolane, boiling at 89° C. (1 mm.), $n_D^{25}$ 1.4308. Infrared absorption showed a strong band at 5.65μ.

*Analysis.*—Calcd. for $C_{13}H_{11}F_8Cl_4NO_2$: C, 30.8; H, 2.2; F, 30.0; Cl, 28.0; N, 2.8. Found: C, 31.1; H, 2.4; F, 30.1; Cl, 27.8; N, 3.0.

*Example 7.—11-ethylimino-5,10-dioxaperfluorodispiro-[3.1.3.2]undecane*

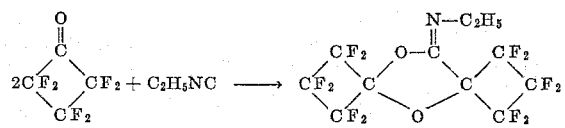

Perfluorocyclobutanone (32 g.) was frozen in an evacuated Carius tube cooled in a liquid nitrogen bath. When one-half the molar amount of ethyl isocyanide (5 g.) was rapidly added to the tube, a very exothermic reaction occurred giving a brown liquid in the bottom of the tube cooled by the liquid nitrogen bath and a deposit of black solid from the vapors above. Distillation of the liquid gave 22 g. (60%) of 11-ethylimino-5,10-dioxaperfluorodispiro[3.1.3.2]undecane as a colorless liquid, B.P. 72° C. (50 mm.), $n_D^{25}$ 1.3411. Infrared showed absorption at 5.65μ.

*Analysis.*—Calcd. for $C_{11}H_5F_{12}NO_2$: C, 32.1; H, 1.2; N, 3.4; F, 55.5. Found: C, 32.4; H, 1.2; N, 3.8; F, 55.6.

*Example 8.—11-t-butylimino-5,10-dioxaperfluorodispiro[3.1.3.2]undecane*

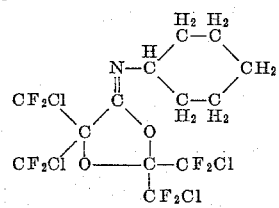

t-Butyl isocyanide (4 g.) was added slowly to slightly more than twice the molar amount of perfluorocyclobutanone (20 g.) frozen in liquid nitrogen in a Carius tube. On warming in a wet ice bath, an exothermic reaction occurred giving a crystalline solid which melted at room temperature. Distillation gave 19.7 g. (93%) of 11 - t - butylimino - 5,10-dioxaperfluorodispiro[3.1.3.2]undecane, B.P. 85° C. (50 mm.), $n_D^{25}$ 1.3475. It crystallized at slightly below room temperature. Infrared showed a band at 5.65μ.

*Analysis.*—Calcd. for $C_{13}H_9F_{12}NO_2$: C, 35.6; H, 2.1; F, 51.9; N, 3.2. Found: C, 34.6; H, 2.2; F, 51.8; N. 3.5.

*Example 9.—11-t-butylimino-3,3,7,7-tetrachloro-1,1,2,2,8,
8,9,9-octafluoro-5,10-dioxadispiro[3.1.3.2]undecane*

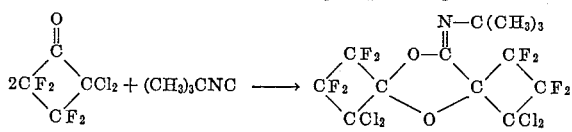

A mixture of 16 g. of α,α-dichlorotetrafluorocyclobutanone in 15 ml. of ether was cooled in an ice bath and stirred while adding 3 g. of t-butyl isocyanide keeping the temperature below 20° C. Distillation gave 15.4 g. (84%) of 11-t-butylimino-3,3,7,7-tetrachloro-1,1,2,2,8,8,9,9 - octafluoro - 5,10-dioxadispiro[3.1.3.2]undecane, B.P. 68° C. (1 mm.), $n_D^{25}$ 1.4192. Infrared showed a strong band at 5.65μ.

*Analysis*—Calcd. for $C_{13}H_9F_8Cl_4NO_2$: C, 30.9; H, 1.8; F, 30.1; Cl, 28.1; N, 2.8. Found: C, 31.5; H, 1.9; F, 30.3; Cl, 27.9; N, 3.2.

The examples have illustrated the products and process of this invention by reference to several specific reactants and products. However, this invention includes other 4-imino - 2,2,5,5-tetrakis(fluoroalkyl)-1,3-dioxolanes of the general formula given hereinbefore. Specific examples of other such iminodioxolanes are listed in the third column of the following table. The corresponding fluorinated ketones and alkyl or cycloalkyl isocyanides from which these particular iminodioxolanes are produced are listed in columns 1 and 2, respectively.

As noted above, the compounds of this invention are useful solvents for polymers containing a high percentage of fluorine. Solutions of such polymers prepared with these solvents can be used to coat cloth or paper to render them oil and water repellent, as illustrated by the following examples:

Five-percent solutions of low melting polytetrafluoroethylene polymer (M.P. 83–145° C.) were prepared in each of the following solvents: 4-t-butylimino-2,2,5,5-tetrakis(trifluoromethyl) - 1,3-dioxolane; 4-ethylimino-2,2,5,5-tetrakis(trifluoromethyl)-1,3-dioxolane; 4-ethylimino-2,5 - bis(chlorodifluoromethyl) - 2,5-bis(trifluoromethyl)-1,3-dioxolane; and 4-cyclohexylimino-2,2,5,5-tetrakis(trifluoromethyl)-1,3-dioxolane. Separate pieces of filter paper were coated with each of these solutions, and the coated paper was dried. The paper prepared in this manner is oil and water repellent. The uncoated paper is easily saturated with oil and water.

Since obvious modifications and equivalents will be evident to those skilled in the chemical arts, I propose to be bound solely by the appended claims.

The embodiments of the invention in which an exclusive property or privilege is claimed are defined as follows:

1. An iminodioxolane of the formula

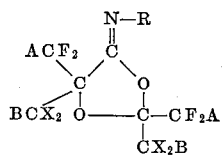

TABLE.—PREPARATION OF 4-IMINO-2,2,5,5-DIOXOLANES

| Fluorinated Ketone | Isocyanide | Product |
|---|---|---|
| $CF_3-\underset{O}{\overset{\|}{C}}-CFCl_2$ | $CH_3(CH_2)_{19}NC$ | 4-[N-(CH₂)₁₉CH₃]imino-dioxolane with CFCl₂, CF₃, O, CF₃, CFCl₂ substituents |
| $CF_3-\underset{O}{\overset{\|}{C}}-CF_3$ | $CH_3NC$ | 4-(N-CH₃)imino-dioxolane with CF₃, CF₃, CF₃, CF₃ substituents |
| α,α-difluoro-β-chloro-β-fluorocyclobutanone | $(CH_3)_2CHNC$ | 4-[N-CH(CH₃)₂]imino-spiro-dioxolane with CFCl, CF₂, CF₃, CFCl, CF₂, CF₂ |
| $CF_3-\underset{O}{\overset{\|}{C}}-CF_3$ | cyclobutyl-NC | 4-(N-cyclobutyl)imino-dioxolane with CF₃, CF₃, CF₃, CF₃ |
| $CF_2Cl-\underset{O}{\overset{\|}{C}}-CF_2Cl$ | $CH_3(CH_2)_4NC$ | 4-[N-(CH₂)₄CH₃]imino-dioxolane with CF₂Cl, CF₂Cl, CF₂Cl, CF₂Cl |
| α,α,β,β-tetrafluorocyclobutanone | $CH_3(CH_2)_{11}NC$ | 4-[N-(CH₂)₁₁CH₃]imino-spiro-dioxolane with CF₂, CF₂, CF₂, CF₂, CF₂, CF₂ | wherein:
   A is selected from the group consisting of fluorine, chlorine, and in combination with B in the two groups attached to the same carbon in the dioxolane ring, —CF$_2$—;
   B is selected from the group consisting of fluorine, and, in combination with A in the two groups attached to the same carbon in the dioxolane ring, —CF$_2$—;
   X is selected from the group consisting of fluorine and chlorine; and
   R is selected from the group consisting of alkyl and cycloalkyl of up to 20 carbons.

2. 4 - cyclohexylimino - 2,2,5,5 - tetrakis(trifluoromethyl-1,3-dioxolane.

3. 4 - t - butylimino - 2,2,5,5 - tetrakis(trifluoromethyl) - 1,3-dioxolane.

4. 4 - ethylimino - 2,2,5,5 - tetrakis(trifluoromethyl)-1,3-dioxolane.

5. 4 - ethylimino - 2,5 - bis(trifluoromethyl) - 2,5-bis(chlorodifluoromethyl)-1,3-dioxolane.

6. 4 - ethylimino-2,5 - bis(dichlorofluoromethyl) - 2,5-bis(chlorodifluoromethyl)-1,3-dioxolane.

7. 4 - cyclohexylimino - 2,2,5,5 - tetrakis(chlorodifluoromethyl)-1,3-dioxolane.

8. 11 - ethylimino - 5,10 - dioxaperfluorodispiro-[3.1.3.2]undecane.

9. 11 - t - butylimino - 5,10 - dioxaperfluorodispiro-[3.1.3.2]undecane.

10. 11 - t - butylimino - 3,3,7,7 - tetrachloro -1,1,2,2,-8,8,9,9-octafluoro-5,10-dioxadispiro[3.1.3.2]undecane.

11. The process of preparing an iminodioxolane of claim 1 which comprises reacting, at a temperature in the range of about —120° to 200° C.,
   a ketone of the formula ACF$_2$COCX$_2$B wherein: A is selected from the group consisting of fluorine, chlorine, and, in combination with B, —CF$_2$—; B is selected from the group consisting of fluorine and, in combination with A, —CF$_2$—; and X is selected from the group consisting of fluorine and chlorine; with
   an isocyanide of the formula RNC, wherein R is selected from the group consisting of alkyl and cycloalkyl of up to 20 carbons.

12. The process of preparing 4-cyclohexylimino-2,2,5,5-tetrakis(trifluoromethyl)-1,2-dioxolane which comprises reacting, at a temperature in the range of about —120° to 200° C., hexafluoroacetone with cyclohexyl isocyanide.

13. The process of preparing 4-t-butylimino-2,2,5,5-tetrakis(trifluoromethyl)-1,3-dioxolane which comprises reacting, at a temperature in the range of about —120° to 200° C., hexafluoroacetone with t-butyl isocyanide.

14. The process of preparing 4-ethylimino-2,2,5,5-tetrakis(trifluoromethyl)-1,3-dioxolane which comprises reacting, at a temperature in the range of about —120° to 200° C., hexafluoroacetone with ethyl isocyanide.

15. The process of preparing 4-ethylimino-2,5-bis-(trifluoromethyl) - 2,5 - bis(chlorodifluoromethyl) - 1,3-dioxolane which comprises reacting, at a temperature in the range of about —120° to 200° C., chloropentafluoroacetone with ethyl isocyanide.

16. The process of preparing 4-ethylimino-2,5-bis-(dichlorofluoromethyl) - 2,5 - bis(chlorodifluoromethyl)-1,3-dioxolane which comprises reacting at a temperature in the range of about —120° to 200° C., 1,3,3-trichloro-1,1,3-trifluoroacetone with ethyl isocyanide.

17. The process of preparing 4-cyclohexylimino-2,2,5,5-tetrakis(chlorodifluoromethyl)-1,3-dioxolane which comprises reacting, at a temperature in the range of about —120° to 200° C., 1,3-dichloro-1,1,3,3-tetrafluoroacetone with cyclohexyl isocyanide.

18. The process of preparing 11-ethylimino-5,10-dioxaperfluorodispiro[3.1.3.2]undecane which comprises reacting, at a temperature in the range of about —120° to 200° C., perfluorocyclobutanone with ethyl isocyanide.

19. The process of preparing 11-t-butylimino-5,10-dioxaperfluorodispiro[3.1.3.2]undecane which comprises reacting, at a temperature in the range of about —120° to 200° C., perfluorocyclobutanone with t-butyl isocyanide.

20. The process of preparing 11-t-butylimino-3,3,7,7-tetrachloro - 1,1,2,2,8,8,9,9 - octafluoro - 5,10 - dioxadispiro[3.1.3.2]undecane which comprises reacting, at a temperature in the range of about —120° to 200° C., α,α-dichlorotetrafluorocyclobutanone with t-butyl isocyanide.

No references cited.

ALEX MAZEL, *Primary Examiner*.
JAMES H. TURNIPSEED, *Assistant Examiner*.